United States Patent
Stuart

(10) Patent No.: US 7,287,504 B2
(45) Date of Patent: Oct. 30, 2007

(54) OVER-CENTER ACTUATOR

(75) Inventor: Philip Edward Arthur Stuart, Chatham (CA)

(73) Assignee: Siemens VDO Automotive Canada Inc., Chatham (CA)

( * ) Notice: Subject to any disclaimer, the term of this patent is extended or adjusted under 35 U.S.C. 154(b) by 0 days.

(21) Appl. No.: 10/977,659

(22) Filed: Oct. 29, 2004

(65) Prior Publication Data

US 2006/0090723 A1    May 4, 2006

(51) Int. Cl.
*F02M 35/10* (2006.01)
(52) U.S. Cl. .............................. 123/184.55; 123/184.56
(58) Field of Classification Search ........... 123/184.55, 123/184.56, 184.53, 336, 337
See application file for complete search history.

(56) References Cited

U.S. PATENT DOCUMENTS

| | | | | |
|---|---|---|---|---|
| 2,323,442 A | * | 7/1943 | Beard .......................... | 123/579 |
| 3,731,555 A | * | 5/1973 | Fresmann ...................... | 74/491 |
| 5,426,990 A | * | 6/1995 | Francart, Jr. ................ | 74/100.1 |
| 5,470,209 A | * | 11/1995 | Hartley et al. .............. | 417/401 |
| 5,950,988 A | * | 9/1999 | Nardick ....................... | 251/303 |
| 5,965,433 A | * | 10/1999 | Gardetto et al. ......... | 435/284.1 |
| 6,286,181 B1 | * | 9/2001 | Kasper et al. ................ | 15/320 |
| 6,401,294 B2 | * | 6/2002 | Kasper ........................ | 15/320 |
| 6,637,397 B2 | | 10/2003 | Ward et al. | |
| 6,694,723 B2 | * | 2/2004 | Ward ........................... | 60/232 |
| 6,910,405 B2 | * | 6/2005 | Walton et al. ................ | 91/15 |
| 2001/0022010 A1 | * | 9/2001 | Kasper ........................ | 15/320 |
| 2003/0205043 A1 | * | 11/2003 | Ward ........................... | 60/232 |

* cited by examiner

*Primary Examiner*—Stephen K. Cronin
*Assistant Examiner*—Hyder Ali

(57) ABSTRACT

The disclosure allows a short runner valve or manifold tuning valve type manifold tuning device to retain sufficient force on the valve assembly in its closed state to eliminate any vibration or chatter from the system under normal engine operation. The disclosure also allows the device to be "pulsed" to the open or closed position; thus no electrical power is required to keep the system in one state. This is especially useful if activated times are extended due to certain engine operating conditions.

10 Claims, 2 Drawing Sheets

OVER-CENTER ACTUATOR

FIELD OF THE INVENTION

This invention relates generally to actuators, and more particularly to a solenoid-operated, over-center actuator having an actuating member that exerts holding force on an actuated member to aid in keeping the actuated member against a limit stop at a limit of travel. The inventive actuator is especially well suited for operating certain valve mechanisms in engine intake systems of motor vehicles.

BACKGROUND OF THE INVENTION

An example of one type of intake system in an internal combustion engine comprises runners through which air is delivered from an air plenum to cylinder intake valves. Tuning of an engine intake system is beneficial in improving various aspects of engine operation, and for that purpose certain tuning mechanisms are present in certain engine intake systems.

One example of such an engine intake system comprises what are essentially a number of butterfly valves, each disposed within a respective runner, ganged together on a common shaft. The shaft is journaled for turning about its axis to correspondingly turn the butterfly valves in unison. Typically the shaft is turned by some type of actuator over a range that is no greater than 90° so that the butterfly valves are operable to impose a maximum restriction to airflow through the runners at one limit of the range and a minimum restriction at the opposite limit. When the butterfly valves are disposed in short runners, they are sometimes called short runner valves. When the short runner valves are closed, incoming air flows from the plenum to the cylinder intake valves through long runners. When the short runner valves are open, incoming air flows from the plenum to the cylinder intake valves through the short runners.

An intake system may also include a manifold tuning valve having a valve element that is journaled for turning about its own axis over a range that is also limited, for example a range of 90°.

Typically the plenum, runners, and associated valves are parts of what is sometimes called an intake manifold assembly, and it is common design practice to mount such an intake manifold assembly directly on an engine. Consequently, the intake manifold is subject to effects resulting from normal engine and motor vehicle operation, including vibration, air pulsation, and temperature extremes. These effects are felt in one way or another by the tuning mechanism.

One manifestation of these effects is tuning valve chatter. Chatter can occur when the short runner valves are closed and also when the manifold tuning valve is closed.

U.S. Pat. No. 6,637,397 addresses the matter of intake manifold tuning valve chatter by providing spring-loaded anti-chatter devices that apply forces against the valve shafts. Those anti-chatter devices comprise multiple parts that have to be individually installed, and a number of anti-chatter devices are required in just one engine intake system. Moreover, the anti-chatter devices are additional to valve actuators.

SUMMARY OF THE INVENTION

The present invention relates to an actuator that associates an over-center spring mechanism with an actuating member to cause the actuating member to exert holding force on an actuated member to aid in keeping the actuated member against a limit stop at a limit of travel. As applied to a tuning mechanism of an engine intake system, the inventive actuator comprises a linearly movable shaft (the actuating member) that is operatively connected to turn a valve shaft on which one or more valves are mounted (the actuated member). The actuating member is linearly extended and retracted by a solenoid. An over-center spring mechanism is disposed laterally of the actuating member. A far end of the over-center spring mechanism is pivotally mounted at a suitable mounting location on the intake system via a pivot joint. A near end of the over-center spring mechanism is connected to the actuating member via another pivot joint.

When the actuating member is in the retracted position, a straight line between the two pivot joints makes an acute angle with the linearly movable actuating member, as measured from a distal segment of the actuating member. When the actuating member is in the extended position, a straight line between the two pivot joints makes an obtuse angle with the linearly movable actuating member, as measured from the distal segment of the actuating member.

In both extended and retracted positions of the actuating member, the straight-line distance between the two pivot joints is relatively longer. As the actuating member is displaced initially from one position toward the other and the over-center spring mechanism begins to swing about the pivot joint at its far end, the straight-line distance between the two pivot joints becomes relatively shorter because the pivot joint that connects the over-center spring mechanism to the actuating member moves linearly with the actuating member. The straight-line distance between the two pivot joints continues to decrease until the over-center spring mechanism has swung to a position where a straight line between the two pivot joints is perpendicular to the actuating member. As the straight-line distance between the two pivot joints was decreasing, the over-center spring mechanism was increasingly compressing an internal spring.

When the over-center spring mechanism has swung to the position where a straight line between the two pivot joints is perpendicular to the actuating member, the spring is maximally compressed and the over-center spring mechanism has minimum length. As the actuating member is displaced farther, the over-center spring mechanism goes over center. The straight-line distance between the two pivot joints now begins increasing, and the energy that had gone into compression of the spring begins to be released as the spring extends. Consequently, the spring force now begins to aid the motion of the actuating member and it will continue to do so until the actuating member arrives at the other limit of travel.

When the actuating member finally stops at that other limit of travel, the spring is still compressed to some degree so that it will continue to exert some force on the actuating member. As will be more fully explained hereinafter, this continued force is effective to resist chatter that otherwise might be induced in the tuning mechanism.

When the actuating member is displaced from the in the opposite sense away from that other limit of travel, the over-center spring mechanism begins to swing about the pivot joint at its far end, and the straight-line distance between the two pivot joints begins to decrease until the over-center spring mechanism has swung to the position where a straight line between the two pivot joints is perpendicular to the actuating member. As the straight-line distance between the two pivot joints was decreasing, the over-center spring mechanism was increasingly compressing the spring.

When the over-center spring mechanism has swung to the position where a straight line between the two pivot joints is perpendicular to the actuating member, the spring is once again maximally compressed. As the actuating member is displaced farther beyond that perpendicularity, the over-center spring mechanism goes over center. The straight-line distance between the two pivot joints now begins increasing, and the energy that had gone into compression of the spring begins to be released as the spring extends. Consequently, the spring force now begins to aid the motion of the actuating member and it will continue to do so until the actuating member arrives at the limit of travel. When the actuating member finally stops, the spring is still compressed to some degree so that it will continue to exert some force on the actuating member, and the continued force is effective to resist chatter that otherwise might be induced in the tuning mechanism while the actuating member is stopped.

The invention provides a spring pre-load on the valve operating shaft in order to keep the valves seated and thereby prevent them from chattering.

The invention also provides for the solenoid to be "fired" in one manner to open the valves and then fired in a different manner to close them. Thus, the solenoid doesn't have to continually draw current from the electrical system, thus offering the potential for extended activated life.

Certain principles of the invention can be practiced with linear and rotary actuators other than solenoids.

These and more aspects and benefits of the invention may be understood from the accompanying drawings and the detailed description given herein.

One generic aspect of the invention relates to an actuator comprising an operator for moving an actuating member in one direction to move an actuated member to one travel limit and in an opposite direction to move the actuated member to an opposite travel limit. An over-center spring mechanism associated with the actuating member impart a spring pre-load force that, with the actuated member at the one travel limit, forces the actuated member in the one direction against a limit stop that defines the one travel limit.

Another generic aspect of the invention relates to an intake system in an internal combustion engine comprising a tuning mechanism for tuning the intake system by selectively positioning a valve mechanism comprising one or more valves in the intake system and an operator for operating the valve mechanism to selectively position the one or more valves. The operator operates the valve mechanism through an actuating member. The operator moves the actuating member in one direction for positioning the one or more valves to a closed position defined by a limit stop and in an opposite direction for positioning the one or more valves to an open position. An over-center spring mechanism imparts to the actuating member a spring pre-load force that, with the one or more valves in closed position, forces the valve mechanism against the limit stop.

Still another generic aspect of the invention relates to a method of attenuating chatter in a tuning mechanism that tunes an internal combustion engine intake system by selective positioning of a valve mechanism that has one or more valves in the intake system. The method comprises electrically energizing a device to apply a force to an actuating member in one direction for causing the valve mechanism to move the one or more valves from an open position toward a closed position defined by a limit stop. As the actuating member is moving over an initial span of travel, a mechanical spring in an over-center spring mechanism that is associated with the actuating member is increasingly compressed until the actuating member has been moved far enough to cause the over-center spring mechanism to go over center. As the actuating member is moving over a final span of travel after the over-center spring mechanism has gone over center, the spring is allowed to release energy imparted to it as it was being increasingly compressed, and once the one or more valves are in closed position, the spring maintains a pre-load force on the valve mechanism that is reacted by the limit stop.

BRIEF DESCRIPTION OF THE DRAWINGS

The accompanying drawings, which are incorporated herein and constitute part of this specification, illustrate a presently preferred embodiment of the invention according to the best mode contemplated at this time, and, together with the detailed description given here, serve to disclose the various aspects and features of the invention.

DETAILED DESCRIPTION OF THE INVENTION

Figure 1:
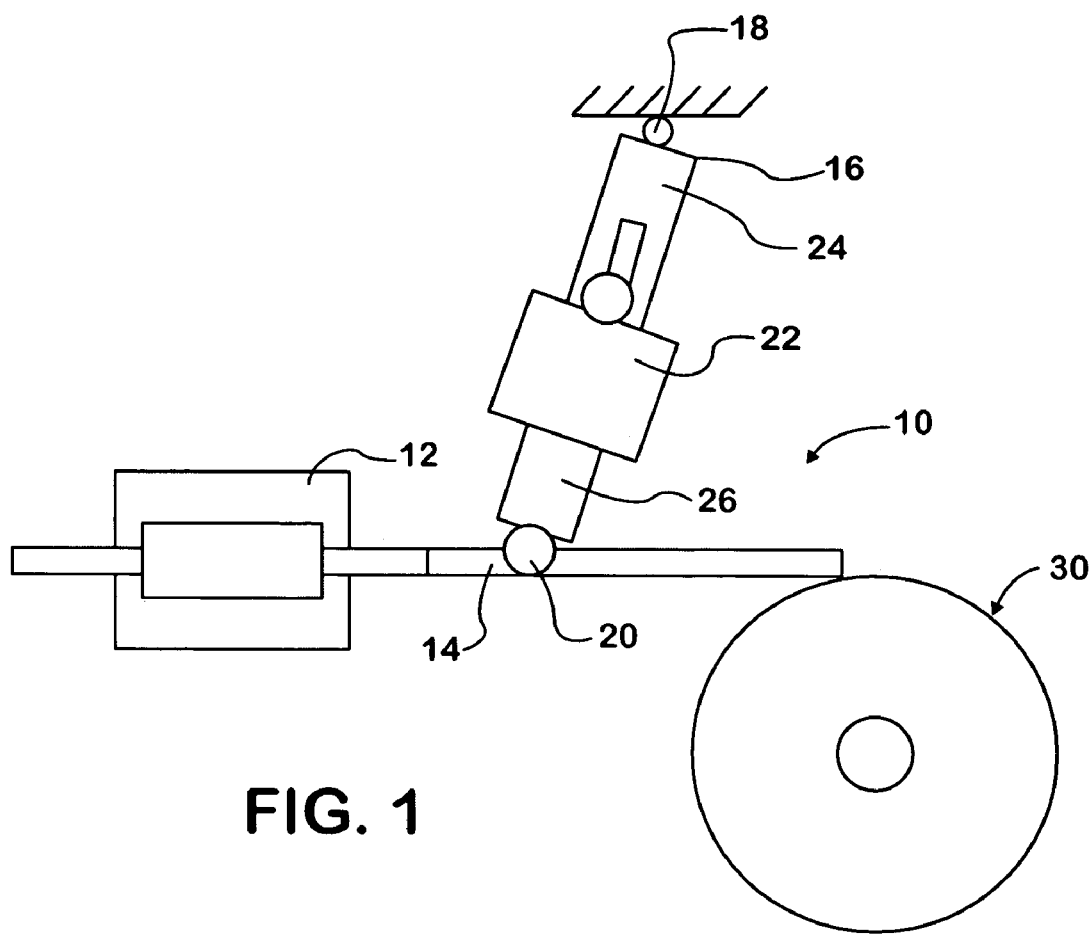
FIG. 1 is a view of an exemplary over-center actuator incorporating principles of the invention in retracted position.
Figure 2:
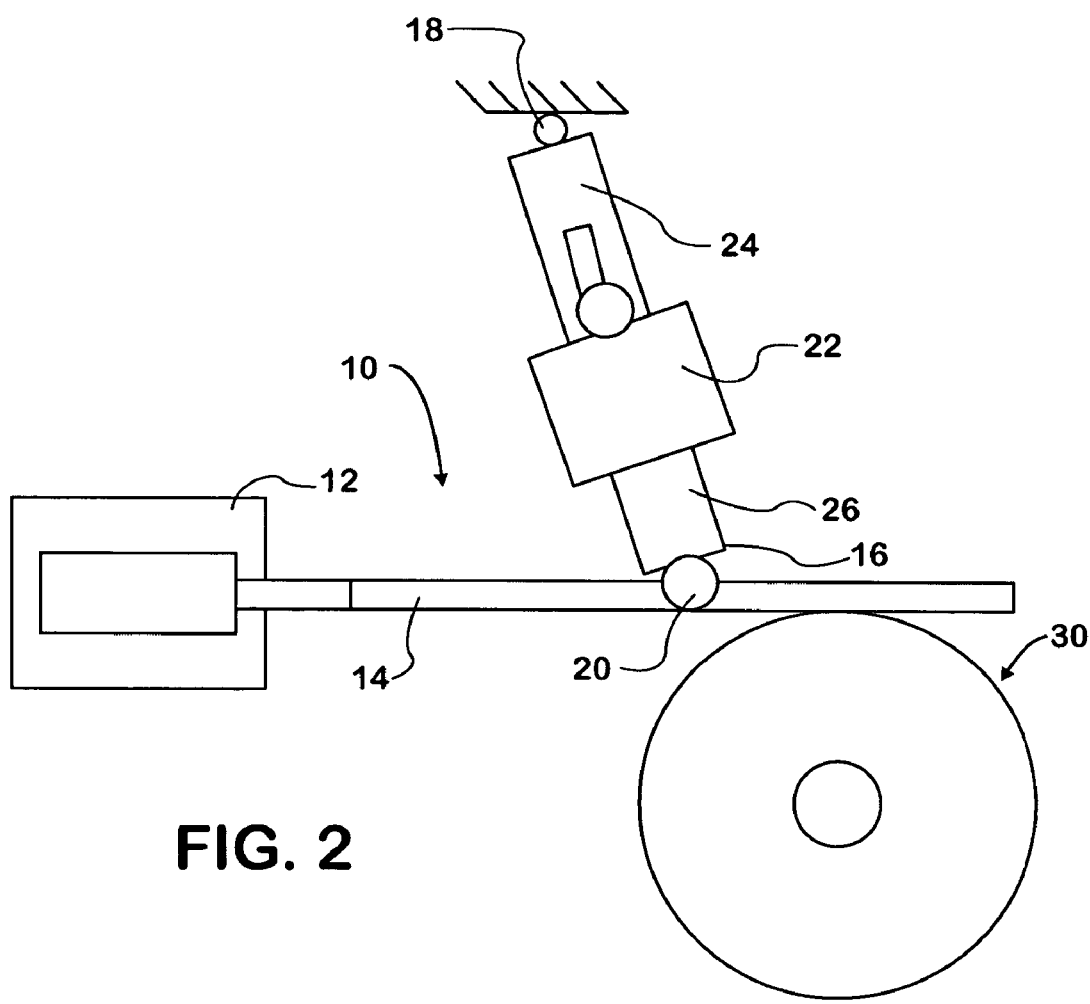
FIG. 2 is a view of an exemplary over-center actuator incorporating principles of the invention in extended position.

FIGS. 1-2 show a over-center spring actuator 10 that comprises a solenoid 12, an actuating member, or drive link, 14, and an over-center spring mechanism 16. Solenoid 12 is energized by an electric pulse (i.e. "fired") only when drive link 14 is to be displaced from retracted position to extended position, or vice versa. When fired in one way, solenoid 12 displaces drive link 14 linearly along its length from retracted position to extended position. When fired in another way, solenoid 12 displaces drive link 14 linearly along its length from extended position to retracted position.

Over-center spring mechanism 16 is pivotally mounted at its far end for swinging motion about a pivot joint 18. The opposite, or near, end has an operative association with drive link 14 that is provided by another pivot joint 20. Over-center spring mechanism 16 comprises an internal spring 22, a helical wound compression spring for example, that acts between a member 24 associated with pivot joint 18 and a member 26 associated with pivot joint 20 for continually exerting a force along the length of mechanism 16. Mechanism 16 is disposed laterally of drive link 14 so that the spring force acts in a sense that is generally transverse to the length of drive link 14.

In the retracted position shown in FIG. 1 that force may be resolved into a component that is parallel to the length of drive link 14 and a component that is perpendicular to the length of drive link 14. When solenoid 12 is next energized in the appropriate way, it delivers a force to drive link 14 sufficiently large to overcome the opposing force component of spring 22, frictional forces, and inertia of the load being moved, thereby displacing drive link 14 linearly toward the extended position.

Drive link 14 has sufficient strength to resist any significant bending, and so as it is being forced toward the extended position by solenoid 12, the straight-line distance between pivot joint 18 and pivot joint 20 begins to decrease, thereby decreasing the overall length of mechanism 16. The decrease in length is allowed because spring 22 can be compressed as members 24 and 26 increasingly telescope.

Although the increased compression of spring 22 will create increasing force acting along the length of mechanism 16, the force component that is parallel to drive link 14 and resists the motion of link 14 will become an increasingly smaller fraction of the total spring force as mechanism 16 swings about pivot joint 18 in the counter-clockwise sense as viewed in FIG. 1.

Solenoid 12 continues to exert sufficient force to swing mechanism 16 to perpendicularity to drive link 14 and slightly beyond. Once mechanism 16 has swung beyond that perpendicularity, the length of mechanism 16 begins to increase. The compression that was imparted to spring 22 before that perpendicularity now becomes effective to aid in extending drive link 14 and will continue to do so until drive link 14 reaches the extended position shown in FIG. 2.

From the description that has just been given, it can be understood that mechanism 16 endows actuator 10 with the ability to continually apply a force that aids in keeping drive link 14 in extended position. In the extended position of drive link 14, the spring force can also be resolved into two components, one that is along the length of link 14 and the other at a right angle to link 14.

When link 14 is to be retracted from the extended position, solenoid 12 is energized in the manner that causes retraction force to be imparted to link 14. That force causes mechanism 16 to swing clockwise about pivot joint 18, increasingly compressing spring 22 in the process. The retraction force that is applied to drive link 14 by solenoid 12 is sufficiently large to overcome the component of the spring force that is resisting the retraction of drive link 14, friction, and load inertia, at least until mechanism 16 has swung to a position where it is somewhat past perpendicularity to drive link 14. Spring 22 can then begin expanding to aid the retraction of drive link 14 until it has returned to the retracted position of FIG. 1.

FIGS. 1 and 2 show over-center spring actuator 10 in use on an engine intake system for operating a tuning valve mechanism 30. The tuning valve mechanism comprises short runner valves (SRV's) or a manifold tuning valve (MTV). One limit stop defines a limit of travel for the SRV/MTV in the direction of closing and another limit stop defines a limit of travel for the SRV/MTV in the direction of opening. The SRV's are fully closed when their motion toward closure is arrested by abutment with the SRV limit stop. Spring preload force keeps the SRV's tightly closed against the SRV limit stop after solenoid 12 ceases to be energized after having been fired to close the SRV's.

While the foregoing has described a preferred embodiment of the present invention, it is to be appreciated that the inventive principles may be practiced in any form that falls within the scope of the following claims.

What is claimed is:

1. An actuator comprising:
   an operator for moving an actuating member in one direction to move an actuated member to one travel limit and in an opposite direction to move the actuated member to an opposite travel limit;
   and an over-center spring mechanism for imparting to the actuating member a spring pre-load force that, with the actuated member at the one travel limit, forces the actuated member in the one direction against a limit stop that defines the one travel limit;
   wherein the operator comprises a solenoid that when energized by an electric pulse with the actuated member at the opposite travel limit moves the actuating member in the one direction to move the actuated member to the one travel limit, and that when energized by an electric pulse with the actuated member at the one travel limit moves the actuating member in the opposite direction to move the actuated member to the opposite travel limit.

2. An intake system in an internal combustion engine comprising:
   a tuning mechanism for tuning the intake system by selectively positioning a valve mechanism comprising one or more valves in the intake system;
   an operator for operating the valve mechanism to selectively position the one or more valves;
   an actuating member through which the operator operates the valve mechanism, wherein the operator moves the actuating member in one direction for positioning the one or more valves to a closed position defined by a limit stop and in an opposite direction for positioning the one or more valves to an open position;
   and an overcenter spring mechanism for imparting to the actuating member a spring pre-load force that, with the one or more valves in closed position, forces the valve mechanism against the limit atop.

3. An intake system as set forth in claim 2 wherein the over-center spring mechanism is disposed to a side of the actuating member and is operatively associated with the actuating member through a pivot joint.

4. An intake system as set forth in claim 3 wherein the pivot joint is disposed at one lengthwise end of the over-center spring mechanism, and a further pivot joint at an opposite lengthwise end of the overcenter spring mechanism mounts the overcenter spring mechanism on a part of the intake system.

5. An intake system as set forth in claim 3 wherein the pivot joint moves with the actuating member, and the overcenter spring mechanism comprises a length that becomes increasingly shorter as the operator moves the actuating member so as to cause the one or more valves to move from open position toward closed position until the mechanism goes over center and that thereafter becomes increasingly longer as the actuating member continues to move the actuating member so as to cause the one or more valves to move to closed position.

6. An intake system as set forth in claim 2 wherein the operator comprises a solenoid that when energized by an electric pulse with the one or more valves in open position moves the actuating member in the one direction to move the one or more valves to closed position, and that when energized by an electric pulse with the one or more valves in closed position moves the actuating member in the opposite direction to move the one or more valves to open position.

7. A method of attenuating chatter in a tuning mechanism that tunes an internal combustion engine intake system by selective positioning of a valve mechanism that has one or more valves in the intake system, the method comprising:
   electrically energizing a device to apply a force to an actuating member in one direction for causing the valve mechanism to move the one or more valves from an open position toward a closed position defined by a limit stop;
   as the actuating member is moving over an initial span of travel, increasingly compressing a mechanical spring in an overcenter spring mechanism that is associated with the actuating member until the actuating member has been moved tar enough to cause the over-center spring mechanism to go over center; and
   as the actuating member is moving over a final span of travel after the overcenter spring mechanism has gone over center, allowing the spring to release energy imparted to it as it was being increasingly compressed, and once the one or more valves are in closed position, maintain a preload force on the valve mechanism that is reacted by the limit stop.

8. A method as set forth in claim 7 including discontinuing electric energization of the device while the one or more valves are in closed position.

9. A method as set forth in claim 8 further including electrically energizing the device to apply a force to the actuating member in an opposite direction for causing the valve mechanism to move the one or more valves from closed position toward open position;

as the actuating member is moving in the opposite direction over the final span of travel, increasingly compressing the spring in the overcenter spring mechanism until the actuating member has been moved far enough to cause the over-center spring mechanism to go over center; and as the actuating member is moving in the opposite direction over the initial span of travel after the over-center spring mechanism has gone over center, allowing the spring to release energy imparted to it as it was being increasingly compressed, and once the one or more valves are in open position, maintain a preload force on the valve mechanism that is reacted a limit stop defining the open position.

10. A method as set forth in claim 9 including discontinuing electric energization of the device while the one or more valves are in open position.

* * * * *